United States Patent
Childress et al.

(10) Patent No.: US 8,958,176 B2
(45) Date of Patent: Feb. 17, 2015

(54) WRITE HEAD POLE LAMINATE STRUCTURE

(75) Inventors: Jeffrey R. Childress, San Jose, CA (US); Alexander M. Zeltser, San Jose, CA (US)

(73) Assignee: HGST Netherlands B.V, Amsterdam (NL)

( * ) Notice: Subject to any disclaimer, the term of this patent is extended or adjusted under 35 U.S.C. 154(b) by 468 days.

(21) Appl. No.: 12/976,993

(22) Filed: Dec. 22, 2010

(65) Prior Publication Data

US 2012/0164487 A1   Jun. 28, 2012

(51) Int. Cl.
*G11B 5/147* (2006.01)
*G11B 5/127* (2006.01)
*G11B 5/31* (2006.01)

(52) U.S. Cl.
CPC .............. *G11B 5/1278* (2013.01); *G11B 5/147* (2013.01); *G11B 5/3116* (2013.01)
USPC ............ 360/125.08; 360/125.01; 360/125.12; 360/125.24; 360/125.26; 360/125.28

(58) Field of Classification Search
USPC ............. 360/125.08, 125.12, 125.01–125.03, 360/125.24, 125.26, 125.28
See application file for complete search history.

(56) References Cited

U.S. PATENT DOCUMENTS

| | | | |
|---|---|---|---|
| 4,610,935 A | 9/1986 | Kumasaka et al. | |
| 4,814,921 A | 3/1989 | Hamakawa et al. | |
| 5,452,167 A | 9/1995 | Nago | |
| 5,663,857 A | 9/1997 | Kumura et al. | |
| 5,862,023 A | 1/1999 | Inoue et al. | |
| 6,437,949 B1 * | 8/2002 | Macken et al. | 360/319 |
| 6,456,467 B1 * | 9/2002 | Mao et al. | 360/319 |
| 7,057,853 B2 | 6/2006 | Okada et al. | |
| 7,221,538 B2 | 5/2007 | Kawato et al. | |
| 7,280,314 B2 * | 10/2007 | Gill et al. | 360/125.12 |
| 7,525,776 B2 * | 4/2009 | Fukuzawa et al. | 360/324.12 |
| 7,656,611 B2 | 2/2010 | Liu et al. | |
| 2005/0002131 A1 * | 1/2005 | Gill | 360/324.12 |
| 2006/0044680 A1 * | 3/2006 | Liu et al. | 360/126 |
| 2006/0119981 A1 * | 6/2006 | Li et al. | 360/125 |
| 2007/0223150 A1 * | 9/2007 | Fukuzawa et al. | 360/324.11 |
| 2009/0009907 A1 | 1/2009 | Zhang et al. | |
| 2009/0073608 A1 * | 3/2009 | Ookawa et al. | 360/125.03 |
| 2010/0033878 A1 * | 2/2010 | Tsunekawa et al. | 360/313 |
| 2010/0119874 A1 * | 5/2010 | Zhang et al. | 428/812 |

FOREIGN PATENT DOCUMENTS

JP   2001-084529   3/2001

* cited by examiner

*Primary Examiner* — Wayne Young
*Assistant Examiner* — Carlos E Garcia
(74) *Attorney, Agent, or Firm* — Patterson & Sheridan, LLP

(57) ABSTRACT

The present invention generally relates to a write head pole laminate structure. The write head pole structure can include multiple multi-layer magnetic structures that are separated by a non-magnetic material that is amorphous or microcrystalline. Each multi-layer magnetic structure includes one or more first magnetic layers that are spaced from one or more second magnetic layers by a non-magnetic layer such that the one or more first magnetic layers are substantially identical to the one or more second magnetic layers. In such a design, the one or more second magnetic layers are antiparallel to the one or more first magnetic layers so that a zero total net magnetic moment is present for the multi-layer magnetic structure when current is removed from the write head pole.

21 Claims, 7 Drawing Sheets

WRITE HEAD POLE LAMINATE STRUCTURE

BACKGROUND OF THE INVENTION

1. Field of the Invention

Embodiments of the present invention generally relate to a write head pole laminate structure.

2. Description of the Related Art

A magnetic recording head for perpendicular writing generally includes two portions, (i) a write head portion or head for writing or programming magnetically encoded information on a magnetic media or disc and (ii) a reader portion for reading or retrieving the stored information from the media.

To write data to the magnetic medium, an electrical current is caused to flow through a conductive coil in the write head to induce a magnetic field across the gap between the main and return poles of the write head. By reversing the polarity of the current through the coil, the polarity of the data written to the magnetic media is also reversed.

The main pole is generally made of a soft magnetic material that becomes magnetized in a direction perpendicular to the ABS, and generates a magnetic field in the media during recording when the current is applied to the coil. The residual magnetic moment of the main pole when the main pole does not have a write current field from the conductive coil should be close to zero, and the easy axis of the main pole should be oriented along an easy axis parallel to the air bearing surface (ABS). The ABS magnetically separates the main and return poles. When the magnetic moment does not return to an orientation parallel to the ABS, the main pole has a remnant moment with a component perpendicular to the ABS. This remnant magnetic field of the main pole may deteriorate or even erase data from the magnetic medium.

SUMMARY OF THE INVENTION

The present invention generally relates to a write head pole laminate structure. The write head pole structure can include multiple multi-layer magnetic structures that are separated by a non-magnetic material. Each multi-layer magnetic structure includes one or more first magnetic layers that are spaced from one or more second magnetic layers by a non-magnetic layer such that the one or more first magnetic layers are substantially identical to the one or more second magnetic layers. In such a design, the one or more second magnetic layers are substantially antiparallel to the one or more first magnetic layers so that a close to zero total magnetic moment is present for the multi-layer magnetic structure when current is removed from the write head pole.

In one embodiment, a write head pole includes a first multi-layer magnetic structure, a first non-magnetic layer disposed over the first multi-layer magnetic structure, and a second multi-layer magnetic structure disposed over the first non-magnetic layer. The first non-magnetic layer comprises a material that is either amorphous or microcrystalline.

In another embodiment, a write head pole includes a first non-magnetic layer, a first multi-layer magnetic structure disposed over the first non-magnetic layer and a second non-magnetic layer disposed over the first multi-layer magnetic structure. The write head pole also includes a second multi-layer magnetic structure disposed over the second non-magnetic layer, a third non-magnetic layer disposed over the second multi-layer magnetic structure, a third multi-layer magnetic structure disposed over the third non-magnetic layer and a fourth non-magnetic layer disposed over the third multi-layer magnetic structure.

In another embodiment, a write head pole includes a first non-magnetic layer having a first thickness, a first multi-layer magnetic structure disposed over the first non-magnetic layer, and a second non-magnetic layer disposed over the first multi-layer magnetic structure and having a second thickness substantially identical to the first thickness. The write head pole also includes a second multi-layer magnetic structure disposed over the second non-magnetic layer, a third non-magnetic layer disposed over the second multi-layer magnetic structure and having a third thickness that is greater than both the first thickness and the second thickness, a third multi-layer magnetic structure disposed over the third non-magnetic layer, the third multi-layer magnetic structure having a substantially identical composition and structure as the second multi-layer magnetic structure and a fourth non-magnetic layer disposed over the third multi-layer magnetic structure and having a fourth thickness that is greater than the third thickness.

In another embodiment, a write head pole includes a first non-magnetic layer, a first multi-layer magnetic structure disposed over the first non-magnetic layer and a second non-magnetic layer disposed over the first multi-layer magnetic structure. The write head pole also includes a second multi-layer magnetic structure disposed over the second non-magnetic layer and having fewer layers than the first multi-layer magnetic structure and a third non-magnetic layer disposed over the second multi-layer magnetic structure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to a write head pole laminate structure. The write head pole structure can include multiple multi-layer magnetic structures that are separated by a non-magnetic material. Each multi-layer magnetic structure includes one or more first magnetic layers that are spaced from one or more second magnetic layers by a non-magnetic layer such that the one or more first magnetic layers are substantially identical to the one or more second magnetic layers. In such a design, the one or more second magnetic layers are substantially antiparallel to the one or more first magnetic layers so that a close to zero total magnetic moment is present for the multi-layer magnetic structure when current is removed from the write head pole.

Figure 1:
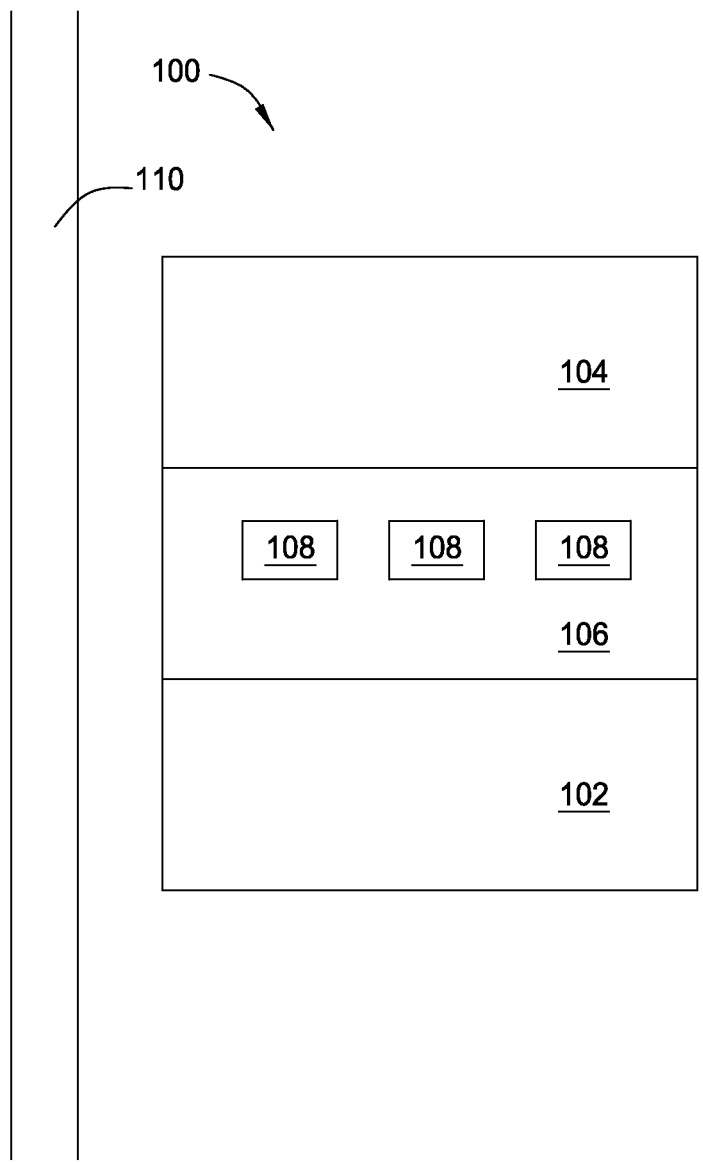
FIG. 1 is a schematic cross-sectional view of a write head pole.

FIG. 1 is a schematic cross-sectional view of a write head pole 100. The write head pole 100 includes a return pole 102 having an ABS and a main pole 104 spaced from the return pole 102 by a gap 106 that has an electrical coil 108 therein. The write head pole 100 is spaced from the magnetic medium 110.

Figures 2, 3:
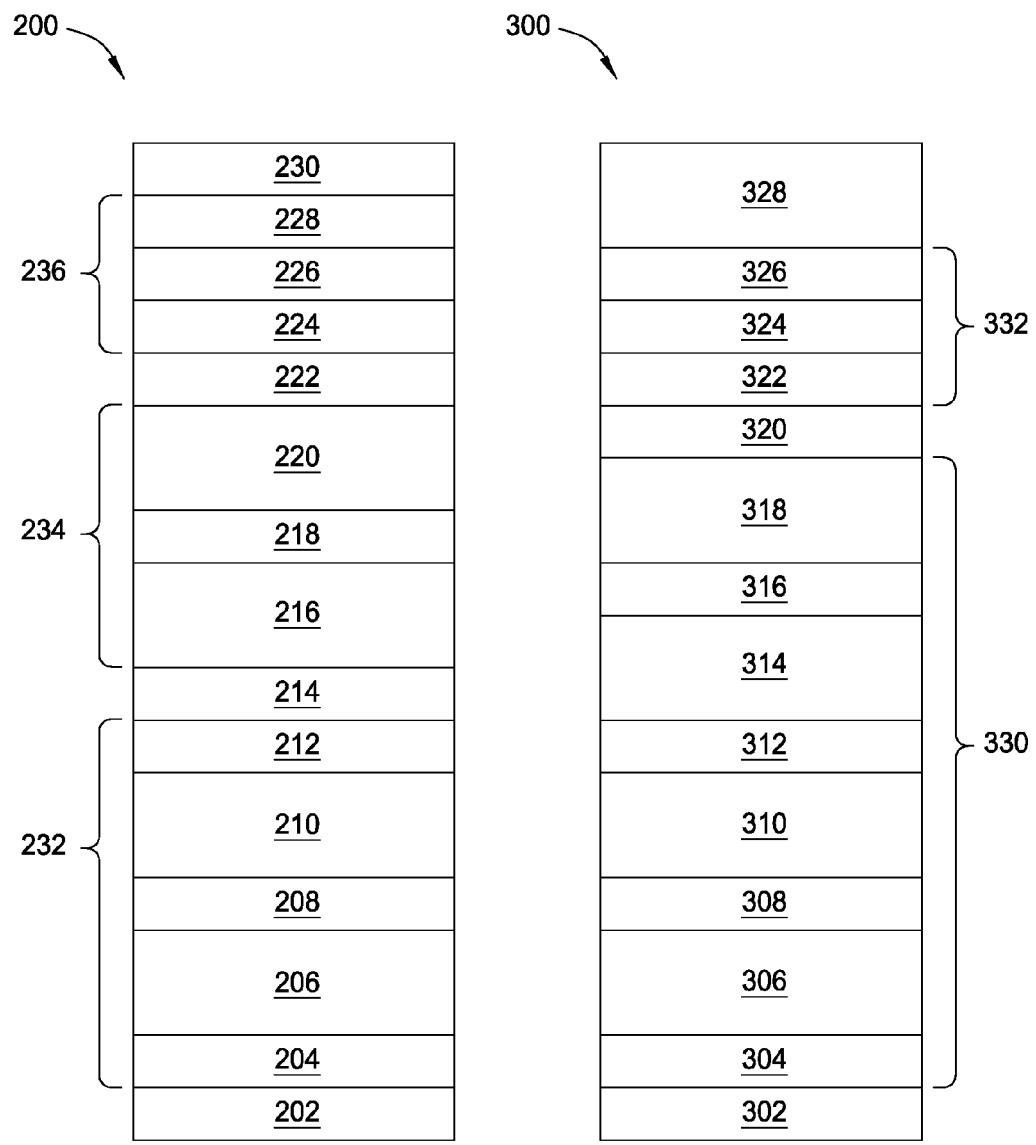
FIG. 2 is a schematic cross-sectional view of the main pole 200 of a write head pole laminate structure according to one embodiment.
FIG. 3 is a schematic cross-sectional view of the main pole 300 of a write head pole laminate structure according to another embodiment.

FIG. 2 is a schematic cross-sectional view of the main pole 200 of a write head pole laminate structure according to one embodiment. The main pole 200 includes a first non-magnetic layer 202. Suitable materials that may be utilized for the first non-magnetic layer 202 includes NiCr, Ru, NiFeTa, Ta, AlO$_x$CoFeHf, CoFeB. Non-magnetic NiFeTa, CoFeHf and CoFeB are usually amorphous, and therefore not only break epitaxial grain growth, but also will reduce roughness and therefore can be made thinner and still break ferromagnetic coupling. It is to be understood that other non-magnetic materials may also be utilized. The first non-magnetic layer 202 may have a thickness of between about 5 Angstroms and about 30 Angstroms.

Over the first non-magnetic layer 202, a first multi-layer magnetic structure 232 is formed. The first multi-layer magnetic structure 232 includes a first magnetic layer 204, a second magnetic layer 206, a non-magnetic layer 208, a third magnetic layer 210 and a fourth magnetic layer 212. The first multi-layer magnetic structure 232 is arranged such that the non-magnetic layer 208 is, in essence, the mirror plane for the magnetic layers of the first multi-layer magnetic structure 232. The first magnetic layer 204 and the fourth magnetic layer 212 comprise the same material in the same composition at the same thickness. Similarly, the second magnetic layer 206 and the third magnetic layer 210 comprise the same material in the same composition at the same thickness. In such an arrangement, the magnetic layers of the first multi-layer magnetic structure 232 are antiparallel coupled together such that when no magnetic field is produced by the coils of the write head pole, the total net magnetic moment for the first multi-layer magnetic structure 232 is close to zero. Suitable materials that may be used for the first magnetic layer 204, the second magnetic layer 206, the third magnetic layer 210 and the fourth magnetic layer 212 include NiFe, FeCo, FeCoN, FeCoN, and other ferromagnetic materials. Suitable thicknesses for the first magnetic layer 204 and the fourth magnetic layer 212 are between about 10 Angstroms and about 100 Angstroms. Suitable thicknesses for the second magnetic layer 206 and the third magnetic layer 210 are between about 200 Angstroms and about 400 Angstroms. Suitable materials that may be used for non-magnetic layer 208 include Cr, Ru, and Iridium. The thickness for non-magnetic layer 208 is between about 5 Angstroms and about 20 Angstroms.

A second multi-layer magnetic structure 234 may then be formed over the first multi-layer magnetic structure 232. The second multi-layer magnetic structure 234 is decoupled from the first multi-layer magnetic structure 232 by a second non-magnetic layer 214. Suitable materials that may be utilized for the second non-magnetic layer 214 include NiCr, Ru, NiFeTa, Ta, AlO$_x$CoFeHf, CoFeB. Non-magnetic NiFeTa, CoFeHf and CoFeB are usually amorphous, and therefore not only break epitaxial grain growth, but also will reduce roughness and therefore can be made thinner and still break ferromagnetic coupling. It is to be understood that other non-magnetic materials may also be utilized. The second non-magnetic layer 214 may have a thickness of between about 5 Angstroms and about 30 Angstroms.

The second multi-layer magnetic structure 234 includes a fifth magnetic layer 216, a non-magnetic layer 218 and a sixth magnetic layer 220. Similar to the first multi-layer magnetic structure 232, the non-magnetic layer 218 is, in essence, the mirror plane for the magnetic layers of the second multi-layer magnetic structure 234. The fifth magnetic layer 216 and the sixth magnetic layer 220 comprise the same material in the same composition at the same thickness. In such an arrangement, the magnetic layers of the second multi-layer magnetic structure 234 are antiparallel coupled together such that when no magnetic field is produced by the coils of the write head pole, the total net magnetic moment for the second multi-layer magnetic structure 234 is close to zero. Suitable materials that may be used for the fifth magnetic layer 216 and the sixth magnetic layer 220 include NiFe, FeCo, FeCoN, and other ferromagnetic materials. Suitable thicknesses for the fifth magnetic layer 216 and the sixth magnetic layer 220 are between about 200 Angstroms and about 400 Angstroms. Suitable materials that may be used for the non-magnetic layer 218 include Cr, Ru, and Ir. The thickness for non-magnetic layer 208 is between about 5 Angstroms and about 20 Angstroms. In one embodiment, the second magnetic layer 206, the third magnetic layer 210, the fifth magnetic layer 216 and the sixth magnetic layer 220 have substantially the same thickness and the same material.

A third multi-layer magnetic structure 236 may then be formed over the second multi-layer magnetic structure 234. The third multi-layer magnetic structure 236 is decoupled from the second multi-layer magnetic structure 234 by a third non-magnetic layer 222. Suitable materials that may be utilized for the third non-magnetic layer 222 include NiCr, Ru, NiFeTa, Ta, AlO$_x$CoFeHf, CoFeB. Non-magnetic NiFeTa, CoFeHf and CoFeB are usually amorphous, and therefore not only break epitaxial grain growth, but also will reduce roughness and therefore can be made thinner and still break ferromagnetic coupling. It is to be understood that other non-magnetic materials may also be utilized. The third non-magnetic layer 222 may have a thickness of between about 5 Angstroms and about 40 Angstroms.

The third multi-layer magnetic structure 236 includes a seventh magnetic layer 224, a non-magnetic layer 226 and an eighth magnetic layer 228. Similar to the second multi-layer magnetic structure 234, the non-magnetic layer 226 is, in essence, the mirror plane for the magnetic layers of the third multi-layer magnetic structure 236. The seventh magnetic layer 224 and the eighth magnetic layer 228 comprise the same material in the same composition at the same thickness. In such an arrangement, the magnetic layers of the third multi-layer magnetic structure 236 are antiparallel coupled together such that when no magnetic field is produced by the coils of the write head pole, the total net magnetic moment for the third multi-layer magnetic structure 236 is close to zero. Suitable materials that may be used for the seventh magnetic layer 224 and the eighth magnetic layer 228 include NiFe, FeCo, FeCoN, FeCoN, and other ferromagnetic materials. Suitable thicknesses for the seventh magnetic layer 224 and the eighth magnetic layer 228 are between about 100 Angstroms and about 300. Suitable materials that may be used for the non-magnetic layer 226 include Cr, Ru, and Ir. The thickness for the non-magnetic layer 226 is between about 5 Angstroms and about 20 Angstroms. In one embodiment, the second magnetic layer 206, the third magnetic layer 210, the fifth magnetic layer 216, the sixth magnetic layer 220, the seventh magnetic layer 224 and the eighth magnetic layer 228 comprise similar materials.

Over the third multi-layer magnetic structure 236, a non-magnetic capping layer 230 is deposited. Suitable materials that may be utilized for the non-magnetic capping layer 230 include NiCr, Ru, NiFeTaCr, Ta, and Ti. It is to be understood that other non-magnetic materials may also be utilized. The non-magnetic capping layer 230 may have a thickness of between about 20 Angstroms and about 100 Angstroms. The non-magnetic capping layer 230 is mainly utilized to protect third multi-layer magnetic structure 236 from oxidation or damage during processing or annealing in the recording head fabrication process.

FIG. 3 is a schematic cross-sectional view of the main pole 300 of a write head pole laminate structure according to another embodiment. The main pole 300 includes a first non-magnetic layer 302. Suitable materials that may be utilized for the first non-magnetic layer 302 include NiCr, Ru, NiFeTa, Ta, AlO$_x$CoFeHf, CoFeB. Non-magnetic NiFeTa, CoFeHf and CoFeB are usually amorphous, and therefore not only break epitaxial grain growth, but also will reduce roughness and therefore can be made thinner and still break ferromagnetic coupling. It is to be understood that other non-magnetic materials may also be utilized. The first non-magnetic layer 302 may have a thickness of between about 5 Angstroms and about 30 Angstroms.

Over the first non-magnetic layer 302, a first multi-layer magnetic structure 330 is formed. The first multi-layer magnetic structure 330 includes a first magnetic layer 304, a second magnetic layer 306, a non-magnetic layer 308, a third magnetic layer 310, a fourth magnetic layer 312, a fifth magnetic layer 314, another non-magnetic layer 316 and a sixth magnetic layer 318. Suitable materials that may be used for the first magnetic layer 304, the second magnetic layer 306, the third magnetic layer 310, the fourth magnetic layer 312, the fifth magnetic layer 314 and the sixth magnetic layer 318 include NiFe, FeCo, FeCoN, and other ferromagnetic materials. The second magnetic layer 306 and the third magnetic layer 310 may comprise the same material having the same composition at the same thickness. Suitable thicknesses for the second magnetic layer 306 and the third magnetic layer 310 are between about 200 Angstroms and about 400 Angstroms. The first magnetic layer 304 and the fourth magnetic layer 312 may comprise the same material having the same composition, yet at different thicknesses. Suitable thicknesses for the first magnetic layer 304 are between about 10 Angstroms and about 50 Angstroms while suitable thicknesses for the fourth magnetic layer 312 are between about 10 Angstroms and about 50 Angstroms. The fifth magnetic layer 314 and the sixth magnetic layer 318 may comprise the same material having the same composition at the same thickness. Suitable thicknesses for the second magnetic layer 306 and the third magnetic layer 310 are between about 200 Angstroms and about 400 Angstroms. Thus, in one embodiment, the second magnetic layer 306, the third magnetic layer 310, the fifth magnetic layer 314 and the sixth magnetic layer 318 may comprise the same material having the same composition at the same thickness. Suitable materials that may be utilized for the non-magnetic layer 308 include Cr, Ru, Ir, and combinations thereof having a thickness of between about 5 Angstroms and about 20 Angstroms.

Non-magnetic layer 316, in essence, is a mirror plane between the fifth magnetic layer 314 and the sixth magnetic layer 318. Non-magnetic layer 308, however, is not exactly a mirror point between the first magnetic layer 304 and second magnetic layer 306 collectively and the third magnetic layer 310 and fourth magnetic layer 312 collectively due to the differences between the first magnetic layer 304 and the fourth magnetic layer 312. Nonetheless, the first magnetic multi-layer structure 330 collectively are antiparallel coupled together such that when no electrical field is applied by the coils of the write head pole, the total net magnetic moment for the first multi-layer magnetic structure 330 is close to zero. Suitable materials that may be utilized for the first non-magnetic layer 302 include NiCr, Ru, NiFeTa, Ta, AlO$_x$CoFeHf, CoFeB. Non-magnetic NiFeTa, CoFeHf and CoFeB are usually amorphous, and therefore not only break epitaxial grain growth, but also will reduce roughness and therefore can be made thinner and still break ferromagnetic coupling. It is to be understood that other non-magnetic materials may also be utilized. The first non-magnetic layer 302 may have a thickness of between about 5 Angstroms and about 30 Angstroms. Suitable materials that may be utilized for the non-magnetic layer 316 include Cr, Ru, Ir, and combinations thereof having a thickness of between about 5 Angstroms and about 20 Angstroms.

A second multi-layer magnetic structure 332 may then be formed over the first multi-layer magnetic structure 330. The second multi-layer magnetic structure 332 is decoupled from the first multi-layer magnetic structure 330 by a non-magnetic layer 320. Suitable materials that may be utilized for the non-magnetic layer 320 include NiCr, Ru, NiFeTa, Ta, AlO$_x$CoFeHf, CoFeB. Non-magnetic NiFeTa, CoFeHf and CoFeB are usually amorphous, and therefore not only break epitaxial grain growth, but also will reduce roughness and therefore can be made thinner and still break ferromagnetic coupling. It is to be understood that other non-magnetic materials may also be utilized. The non-magnetic layer 320 may have a thickness of between about 10 Angstroms and about 50 Angstroms.

The second multi-layer magnetic structure 332 includes a seventh magnetic layer 322, a non-magnetic layer 324 and an eighth magnetic layer 326. The non-magnetic layer 324 is, in essence, the mirror plane for the magnetic layers. The seventh magnetic layer 322 and the eighth magnetic layer 326 comprise the same material in the same composition at the same thickness. In such an arrangement, the magnetic layers of the second multi-layer magnetic structure 332 are antiparallel coupled together such that when no electrical field is applied by the coils of the write head pole, the total magnetic moment of the second multi-layer magnetic structure 332 is close to zero. Suitable materials that may be used for the seventh magnetic layer 322 and the eighth magnetic layer 326 include NiFe, FeCo, FeCoN, FeCoN, and other ferromagnetic materials. Suitable thicknesses for the seventh magnetic layer 322 and the eighth magnetic layer 326 are between about 190 Angstroms and about 215 Angstroms. Suitable materials that may be used for the non-magnetic layer 324 include chromium, Ru and Ir. The thickness for the non-magnetic layer 324 is between about 5 Angstroms and about 20 Angstroms. In one embodiment, the second magnetic layer 306, the third magnetic layer 310, the fifth magnetic layer 314, the sixth magnetic layer 318, the seventh magnetic layer 322 and the eighth magnetic layer 326 comprise same material.

Over the second multi-layer magnetic structure 332, a non-magnetic capping layer 328 is deposited. Suitable materials that may be utilized for the non-magnetic capping layer 328 include NiCr, Ru, NiFeTa, Ta, $AlO_x$ CoFeHf, CoFeB. Non-magnetic NiFeTa, CoFeHf and CoFeB are usually amorphous, and therefore not only break epitaxial grain growth, but also will reduce roughness and therefore can be made thinner and still break ferromagnetic coupling. It is to be understood that other non-magnetic materials may also be utilized. The non-magnetic capping layer 328 may have a thickness of between about 30 Angstroms and about 100 Angstroms. The non-magnetic capping layer 328 is mainly utilized to protect multi-layer magnetic structure 332 from oxidation or damage during processing or annealing in the recording head fabrication process.

Figure 4:
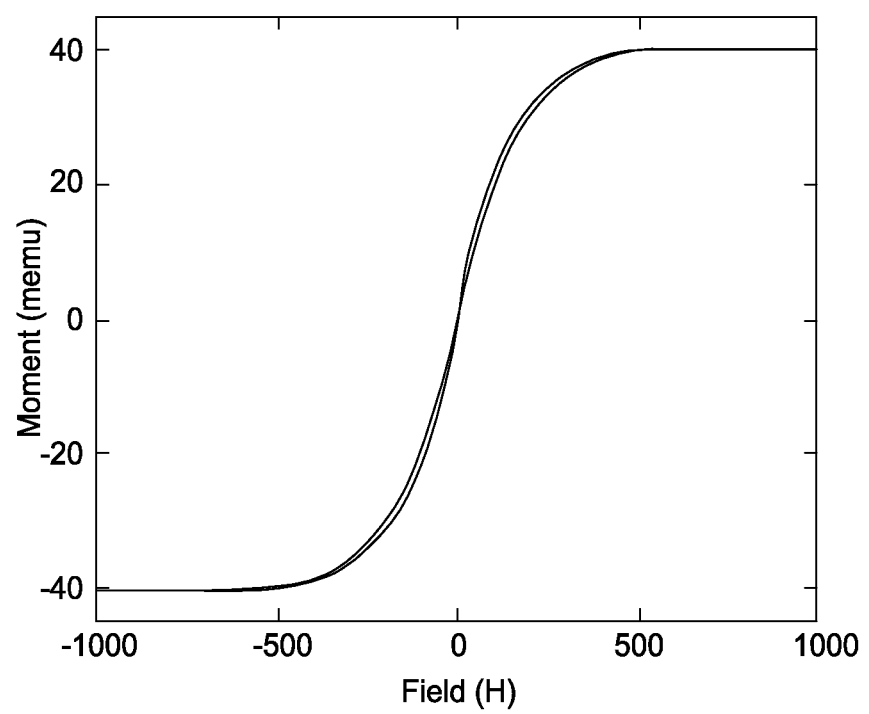
FIG. 4 is a graph showing the moment versus the magnetic field for an ideal write head pole laminate structure.

FIG. 4 is a graph showing the moment versus the magnetic field for an ideal write head pole laminate structure. The graph shows the expected antiparallel coupled loop shape with a saturation of approximately 500 Oe. The curve shows that there is no magnetic remanence. Thus, FIG. 4 is the ideal shape for a moment versus magnetic field and is the goal for all write head poles.

It has surprisingly been found that when all of the layers formed are crystalline, the write head pole will have poor antiparallel coupling. Crystalline structures have a grain structure of 20 nm or more. Amorphous structures, on the other hand, have no extended crystalline grains. Microcrystalline structures have grain structures, but the grain size is less than 5 nm. In between microcrystalline and crystalline structures (i.e., greater than 5 nm and less than 20 nm) is a hybrid crystalline structure. Each of the multi-layer magnetic structures will be crystalline. By using an amorphous or microcrystalline layer between the multi-layer magnetic structures in the stack, the crystalline growth resets or zeros out and begins anew with each multi-layer magnetic structure rather than continuing along the crystalline growth started in the layer below. One consequence of extended crystalline grains in a polycrystalline film structure is the increase of surface roughness, due to the curved top surface of typical individual crystalline grains. FIGS. 5A-5G shows in detail the negative effects on magnetic properties of crystalline layers between the multi-layer magnetic structures.

Figure 5A:
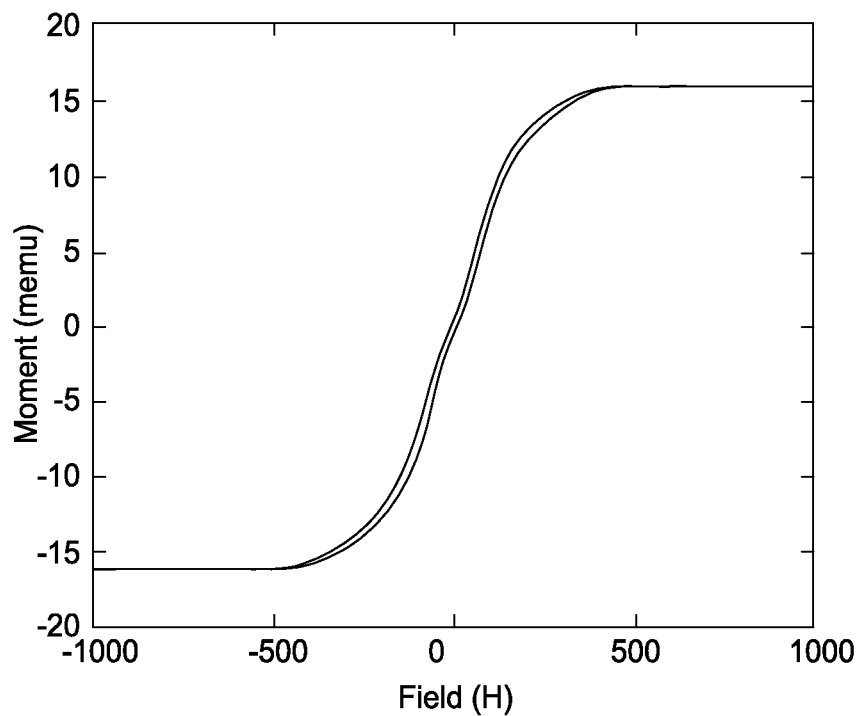
FIG. 5A is a graph showing the moment versus the magnetic field for the first multi-layer magnetic structure of FIG. 2 formed in a structure without the second and third multi-layer magnetic structures.

FIG. 5A is a graph showing the moment versus the magnetic field for the first multi-layer magnetic structure of FIG. 2 formed in a structure without the second and third multi-layer magnetic structures. FIG. 5A is based upon a write pole head made with the first multi-layer magnetic structure only bound by non-magnetic layers. Specifically, the write pole head structure comprises a 10 Angstrom thick NiCr layer, a 30 Angstrom thick NiFe layer, a 374 Angstrom thick FeCo layer, a 11.5 Angstrom thick chromium layer, a 374 Angstrom thick FeCo layer, a 30 Angstrom thick NiFe layer and a 100 Angstrom thick NiCr capping layer. As can be seen from FIG. 5A, the moment versus magnetic field curve approximates the ideal curve shown in FIG. 4. This is because the first multi-layer magnetic structure is simply formed upon a non-magnetic layer and thus only builds upon the crystalline grain structures of the non-magnetic layer. There is no multi-layer crystalline structure upon which to continue the crystalline structure. Of course, the non-magnetic layer may be formed as a microcrystalline layer or an amorphous layer to improve the results.

Figure 5B:
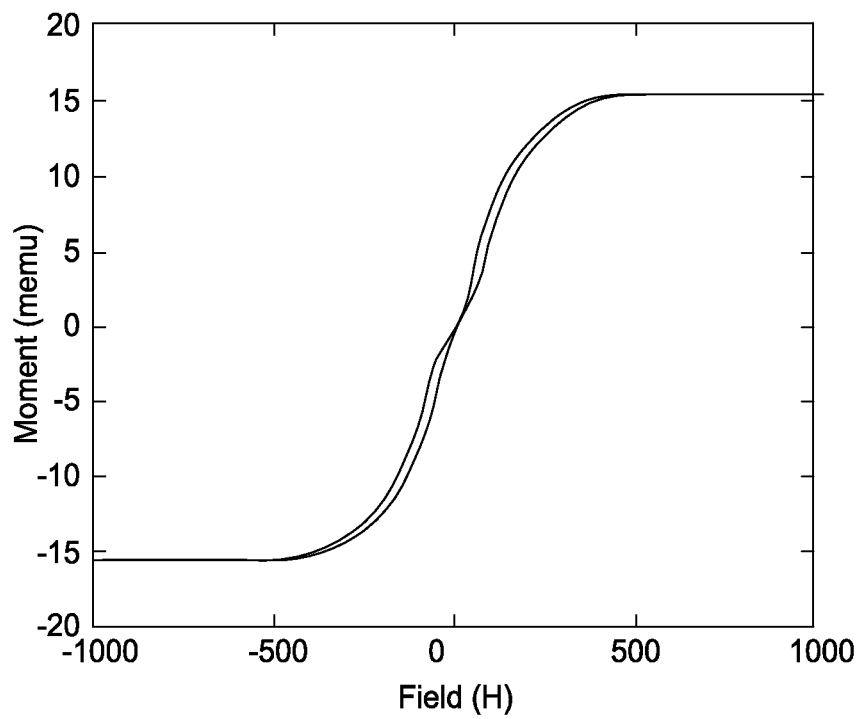
FIG. 5B is a graph showing the moment versus the magnetic field for the second multi-layer magnetic structure of FIG. 2 formed in a structure without the first and third multi-layer magnetic structures.

FIG. 5B is a graph showing the moment versus the magnetic field for the second multi-layer magnetic structure of FIG. 2 formed in a structure without the first and third multi-layer magnetic structures. Specifically, the write pole head structure comprises a 10 Angstrom thick NiCr layer, a 374 Angstrom thick FeCo layer, a 11.5 Angstrom thick chromium layer, a 374 Angstrom thick FeCo layer and a 100 Angstrom thick NiCr capping layer and formed one on top of the other. As can be seen from FIG. 5B, the moment versus magnetic field curve approximates the ideal curve shown in FIG. 4 and FIG. 5A. This is because the second multi-layer magnetic structure is simply formed upon a non-magnetic layer and thus only builds upon the crystalline grain structures of the non-magnetic layer. There is no multi-layer crystalline structure upon which to continue the crystalline structure. Of course, the non-magnetic layer may be formed as a microcrystalline layer or an amorphous layer to improve the results.

Figure 5C:
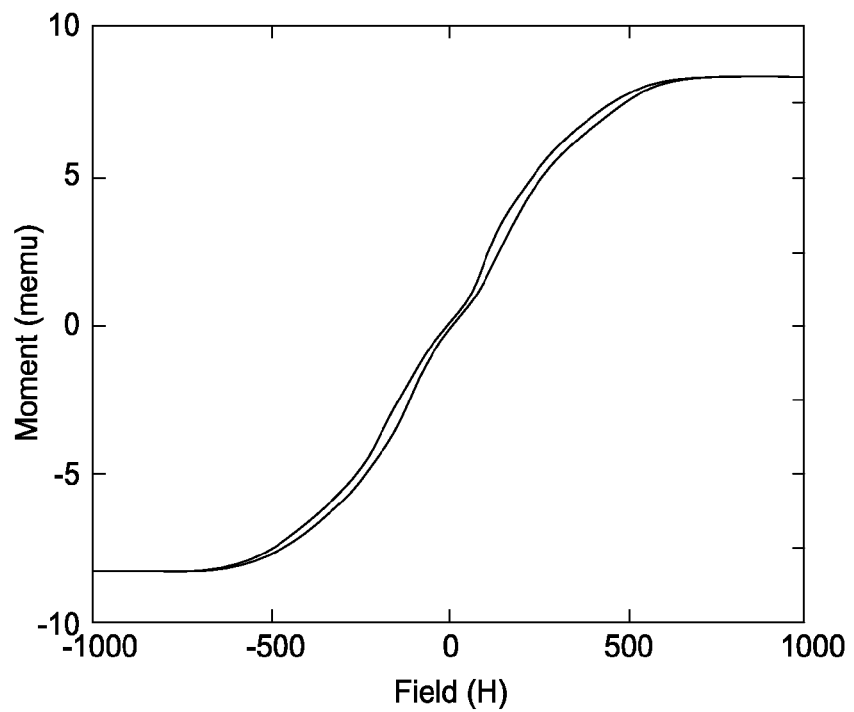
FIG. 5C is a graph showing the moment versus the magnetic field for the third multi-layer magnetic structure of FIG. 2 formed in a structure without the first and second multi-layer magnetic structures.

FIG. 5C is a graph showing the moment versus the magnetic field for the third multi-layer magnetic structure of FIG. 2 formed in a structure without the first and second multi-layer magnetic structures. Specifically, the write pole head structure comprises a 10 Angstrom thick NiCr layer, a 200 Angstrom thick FeCo layer, a 11.5 Angstrom thick chromium layer, a 200 Angstrom thick FeCo layer and a 100 Angstrom thick NiCr capping layer all formed one on top of the other. As can be seen from FIG. 5C, the moment versus magnetic field curve is different from the ideal curve shown in FIG. 4. This is because the third multi-layer magnetic structure is about half the thickness of the first and second multi-layer magnetic structures and therefore should have about two times the saturation field. The third multi-layer magnetic structure is simply formed upon a non-magnetic layer and thus only builds upon the crystalline grain structures of the non-magnetic layer. There is no multi-layer crystalline structure upon which to continue the crystalline structure. Of course, the non-magnetic layer may be formed as a microcrystalline layer or an amorphous layer to improve the results.

Figure 5D:
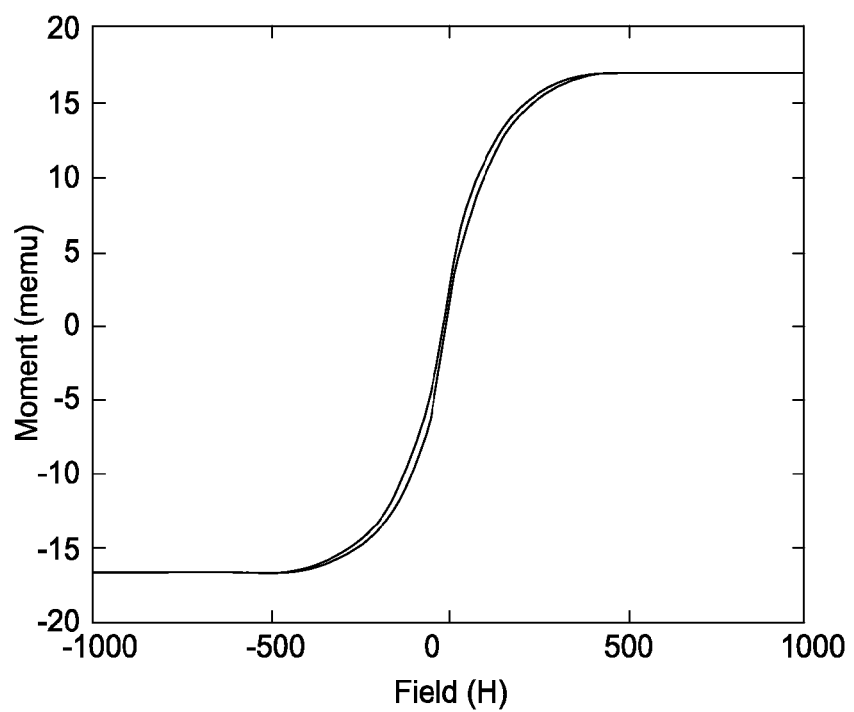
FIG. 5D is a graph showing the moment versus the magnetic field for the second multi-layer magnetic structure of FIG. 2 formed in a structure without the third multi-layer magnetic structure.

FIG. 5D is a graph showing the moment versus the magnetic field for the second multi-layer magnetic structure of FIG. 2 formed in a structure without the third multi-layer magnetic structure. It is to be noted that for the second multi-layer magnetic structure was formed over the first multi-layer magnetic structure so that the effects of the second multi-layer magnetic structure formed by itself could be compared to the effects of the second multi-layer magnetic structure formed over the first multi-layer magnetic structure. Specifically, the write head pole structure included a 10 Angstrom thick NiCr layer, a 30 Angstrom thick NiFe layer, a 374 Angstrom thick FeCo layer, a 11.5 Angstrom thick chromium layer, a 374 Angstrom thick FeCo layer, a 30 Angstrom thick NiFe layer, a 10 Angstrom thick NiCr layer, a 374 Angstrom thick FeCo layer, a 11.5 angstrom thick chromium layer, a 374 Angstrom thick FeCo layer and a 100 Angstrom thick NiCr layer all formed one on top of the other. In order to evaluate the effects of the second multi-layer magnetic structure, the results for the first multi-layer magnetic structure (i.e., shown in FIG. 5A), were subtracted to reveal the curve shown in FIG. 5D. The results of FIGS. 5B and 5D are different. It is believed that the texture and roughness effects of growing multiple crystalline layers in a stack contributes to the difference. This is because the second multi-layer magnetic structure for FIG. 5D is formed upon a crystalline non-magnetic layer that is formed over the crystalline first multi-layer magnetic structure and thus builds upon the crystalline grain structures of the non-magnetic layer which builds upon the crystalline structures of the first multi-layer magnetic structure. Therefore, the crystalline growth contributes to the remanence. Utilizing a microcrystalline or amorphous non-magnetic layer between the first multi-layer magnetic structure and the second multi-layer magnetic structure will reduce or even eliminate the remanence.

Figure 5E:
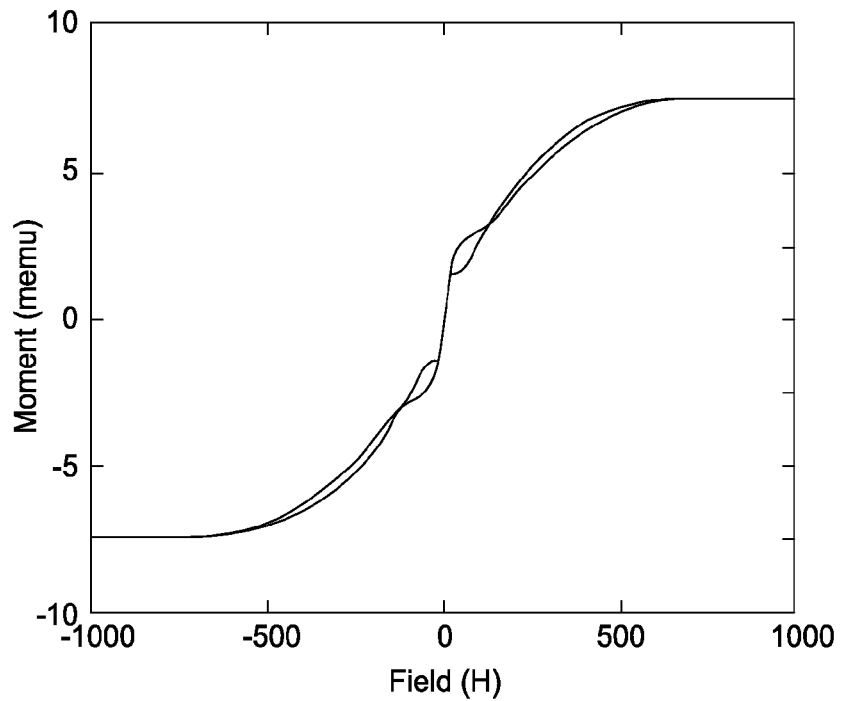
FIG. 5E is a graph showing the moment versus the magnetic field for the third multi-layer magnetic structure of FIG. 2 formed in a structure containing the first and second multi-layer magnetic structures.

FIG. 5E is a graph showing the moment versus the magnetic field for the third multi-layer magnetic structure of FIG. 2 formed in a structure containing both the first and second multi-layer magnetic structures. It is to be noted that the third multi-layer magnetic structure was formed over both the first and second multi-layer magnetic structures so that the effects of the third multi-layer magnetic structure formed by itself could be compared to the effects of the third multi-layer magnetic structure formed over the first and second multi-layer magnetic structures. Specifically, the write head pole structure included a 10 Angstrom thick NiCr layer, a 30 Angstrom thick NiFe layer, a 374 Angstrom thick FeCo layer, a 11.5 Angstrom thick chromium layer, a 374 Angstrom thick FeCo layer, a 30 Angstrom thick NiFe layer, a 10 Angstrom thick NiCr layer, a 374 Angstrom thick FeCo layer, a 11.5 Angstrom thick chromium layer, a 374 Angstrom thick FeCo layer, a 30 Angstrom thick NiCr layer, a 200 Angstrom thick FeCo layer, a 11.5 Angstrom thick chromium layer, a 200 Angstrom thick FeCo layer and a 100 Angstrom thick NiCr layer all formed one on top of the other. In order to evaluate the effects of the third multi-layer magnetic structure, the results for the first and second multi-layer magnetic structures were subtracted to reveal the curve shown in FIG. 5E. The results of FIGS. 5C and 5E are different. In fact, the difference is more pronounced for the third multi-layer magnetic structure as compared to the second multi-layer magnetic structure. It is believed that the texture and roughness effects of growing multiple crystalline layers in a stack contributes to the difference. This is because the third multi-layer magnetic structure for FIG. 5E is formed upon a crystalline non-magnetic layer that is formed over the crystalline second multi-layer magnetic structure that is formed over a crystalline non-magnetic layer that is formed over the crystalline first multi-layer magnetic structure. Thus, the write head pole structure builds upon the crystalline grain structures of the non-magnetic layers which builds upon the crystalline structures of both the first and second multi-layer magnetic structures. Therefore, the crystalline growth contributes to the remanence. Utilizing a microcrystalline or amorphous non-magnetic layer between the first multi-layer magnetic structure and the second multi-layer magnetic structure as well as between the second multi-layer magnetic structure and the third multi-layer magnetic structure will reduce or even eliminate the remanence.

Figure 5F:
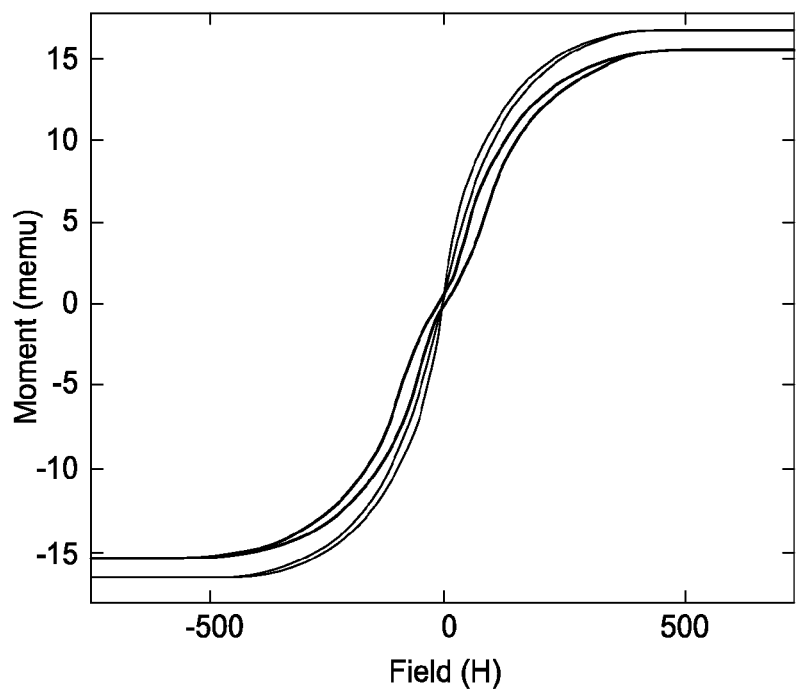
FIG. 5F is a graph of FIG. 5D overlaid FIG. 5B.

FIG. 5F is a graph of FIG. 5D overlaid FIG. 5B. As can be clearly seen from FIG. 5F, there is a striking difference in the curves for the effects of the second multi-layer magnetic structure. The low field permeability is larger and the saturation field is slightly smaller for the second multi-layer magnetic structure when formed in a stack containing the first multi-layer magnetic structure as compared to grown separately. The higher moment for the second multi-layer magnetic structure when formed in a stack together with the first multi-layer magnetic structure is believed to be due to the lower moment in the structure that contains the first multi-layer magnetic structure only. The results suggest that there is a weaker antiparallel coupling or a poor antiparallel coupling distribution when the stack continues the growth of the crystalline first multi-layer magnetic structure through the non-magnetic layer and into the second multi-layer magnetic structure. An amorphous or microcrystalline non-magnetic layer between the first and second multi-layer magnetic structure will permit the crystal growth to reset at the second multi-layer magnetic structure and reduce or eliminate remanence.

Figure 5G:
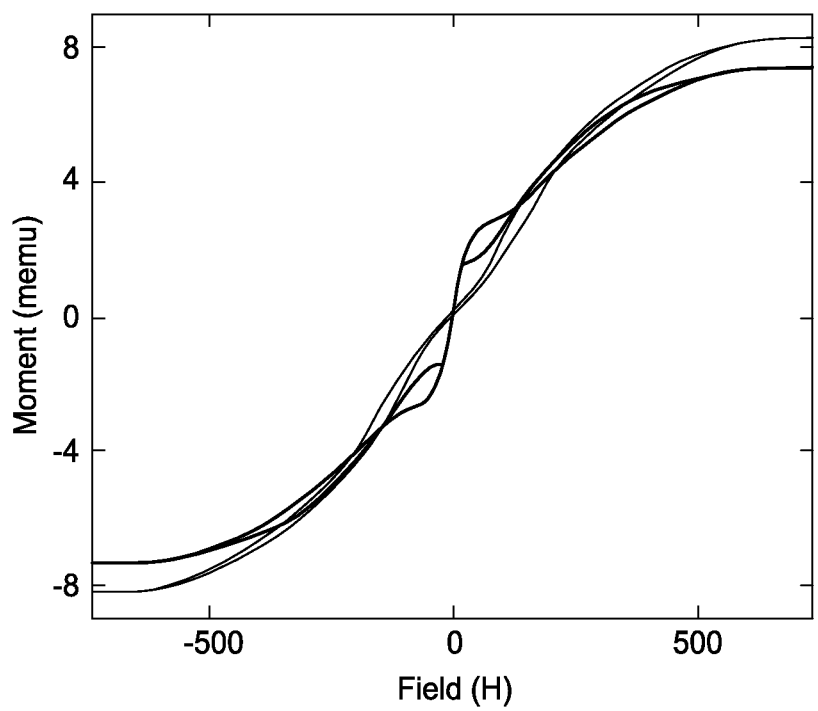
FIG. 5G is a graph of FIG. 5E overlaid FIG. 5C.

FIG. 5G is a graph of FIG. 5E overlaid FIG. 5C. As can be clearly seen from FIG. 5G, there is a striking difference in the curves for the effects of the third multi-layer magnetic structure. The low field permeability is much larger and the saturation field is smaller for the third multi-layer magnetic structure when formed in a stack containing the first and second multi-layer magnetic structures as compared to grown separately. The results suggest that there is a weaker or not-optimized antiparallel coupling when the stack continues the growth of the crystalline structure from the first and second multi-layer magnetic structures and the non-magnetic layers through the third multi-layer magnetic structure. As shown in FIG. 5G, about one third of the moment is not well anti-parallel coupled. An amorphous or microcrystalline non-magnetic layer between the first and second multi-layer magnetic structure as well as between the second multi-layer magnetic structure and the third multi-layer magnetic structure will permit the crystal growth to reset at the second multi-layer magnetic structure and again at the third multi-layer magnetic structure and thus reduce or eliminate remanence.

There are several other mechanisms contemplated as alternative for resetting the crystalline growth. One manner is to utilize a plasma treatment to smooth the non-magnetic layer between the stacks. Another manner is to add additional layers above the non-magnetic layer to reduce the overall surface roughness such as a thick Ru (>9 A) layer, an $Al_2O_3$ layer, a non-magnetic CoFeX layer (where X is a non-magnetic element), or a non-magnetic NiFeTa layer for example. In utilizing multiple layers, there is a trade off in that the thicker the non-magnetic material, the more dilution of the magnetic field out of the write head pole, which is not desired. Another manner is to replace the non-magnetic layer of NiCr with a thick Ru layer, an $Al_2O_3$ layer, a non-magnetic CoFeX layer (where x is a non-magnetic element), or a non-magnetic NiFeTa layer for example. Additionally, the non-magnetic thickness can be different within each multi-layer magnetic structure to optimize the remanence. The further up the stack and away from the bottom-most non-magnetic layer, the greater the thickness of the non-magnetic layers may be to account for surface roughness and crystalline growth.

Thus, it has surprisingly been found that by depositing a microcrystalline or amorphous non-magnetic layer between the multi-layer magnetic structures of a write head main pole, the magnetic remanence may be optimized.

While the foregoing is directed to embodiments of the present invention, other and further embodiments of the invention may be devised without departing from the basic scope thereof, and the scope thereof is determined by the claims that follow.

What is claimed is:

1. A write head pole, comprising:
   a first multi-layer magnetic structure having a first number of layers, wherein each layer of the first multi-layer magnetic structure is crystalline;
   a first non-magnetic layer disposed on the first multi-layer magnetic structure, wherein the first non-magnetic layer is amorphous or microcrystalline; and
   a second multi-layer magnetic structure disposed on the first non-magnetic layer and having a second number of layers, wherein the first number of layers is different than the second number of layers, and each layer of the second multi-layer magnetic structure is crystalline, wherein the second multi-layer magnetic structure has at least one non-magnetic layer positioned in the center of the second multi-layer magnetic structure.

2. A write head pole, comprising:
   a first multi-layer magnetic structure having a first number of layers, wherein each layer of the first multi-layer magnetic structure is crystalline;
   a first non-magnetic layer disposed under the first multi-layer magnetic structure, wherein the first non-magnetic layer is amorphous or microcrystalline;
   a second multi-layer magnetic structure disposed on the first non-magnetic layer and having a second number of layers, wherein the first number of layers is different than the second number of layers, and each layer of the second multi-layer magnetic structure is crystalline, wherein the second multi-layer magnetic structure has at least one non-magnetic layer positioned in the center of the second multi-layer magnetic structure;
   a second non-magnetic layer, wherein the second multi-layer magnetic structure is disposed over the second non-magnetic layer;
   a third non-magnetic layer disposed over the second multi-layer magnetic structure;
   a third multi-layer magnetic structure disposed over the third non-magnetic layer; and
   a fourth non-magnetic layer disposed over the third multi-layer magnetic structure, wherein the third non-magnetic layer is amorphous or microcrystalline.

3. The write head pole of claim 2, wherein the first multi-layer magnetic structure comprises:
   a first magnetic layer having a first thickness;
   a second magnetic layer disposed on the first magnetic layer and having a second thickness;
   a fifth non-magnetic layer disposed on the second magnetic layer;
   a third magnetic layer disposed on the fifth non-magnetic layer and having a third thickness; and
   a fourth magnetic layer disposed on the third magnetic layer and having a fourth thickness.

4. The write head pole of claim 3, wherein the first thickness and the fourth thickness are substantially the same and wherein the second thickness and the third thickness are substantially the same.

5. The write head pole of claim 4, wherein the first magnetic layer and the fourth magnetic layer comprise NiFe and wherein the second magnetic layer and the third magnetic layer comprise FeCo.

6. The write head pole of claim 3, wherein the second multi-layer magnetic structure comprises:
   a fifth magnetic layer having a fifth thickness;
   a sixth non-magnetic layer disposed on the fifth magnetic layer; and
   a sixth magnetic layer disposed on the sixth non-magnetic layer and having a sixth thickness.

7. The write head pole of claim 6, wherein the fifth thickness and the sixth thickness are substantially the same and wherein the fifth magnetic layer and the sixth magnetic layer comprise FeCo.

8. The write head pole of claim 6, wherein the third multi-layer magnetic structure comprises:
   a seventh magnetic layer having a seventh thickness;
   a seventh non-magnetic layer disposed on the seventh magnetic layer; and
   an eighth magnetic layer disposed on the seventh non-magnetic layer and having an eighth thickness.

9. The write head pole of claim 8, wherein the seventh thickness and the eighth thickness are substantially the same and wherein the seventh magnetic layer and the eighth magnetic layer comprise FeCo.

10. A write head pole, comprising:
    a first non-magnetic layer having a first thickness;
    a first multi-layer magnetic structure disposed over the first non-magnetic layer and having a first number of layers, wherein each layer of the first multi-layer magnetic structure is crystalline;
    a second non-magnetic layer disposed over the first multi-layer magnetic structure and having a second thickness substantially equal to the first thickness;
    a second multi-layer magnetic structure disposed over the second non-magnetic layer and having a second number of layers, wherein the first number of layers is different than the second number of layers, and each layer of the second multi-layer magnetic structure is crystalline, wherein the second multi-layer magnetic structure has at least one non-magnetic layer positioned in the center of the second multi-layer magnetic structure;
    a third non-magnetic layer disposed over the second multi-layer magnetic structure and having a third thickness that is greater than both the first thickness and the second thickness;
    a third multi-layer magnetic structure disposed over the third non-magnetic layer, the third multi-layer magnetic structure having a substantially identical composition as the second multi-layer magnetic structure, wherein each layer of the third multi-layer magnetic structure is crystalline; and
    a fourth non-magnetic layer disposed over the third multi-layer magnetic structure and having a fourth thickness that is greater than the third thickness, wherein one or more of the second non-magnetic layer and the third non-magnetic layer are amorphous or microcrystalline.

11. The write head pole of claim 10, wherein the second multi-layer magnetic structure comprises:
    a first FeCo layer having a first thickness;
    a fifth non-magnetic layer disposed on the first FeCo layer; and
    a second FeCo layer disposed on the fifth non-magnetic layer having a second thickness substantially equal to the first thickness.

12. The write head pole of claim 11, wherein the third multi-layer magnetic structure comprises:
- a third FeCo layer having a third thickness;
- a sixth non-magnetic layer disposed on the third FeCo layer; and
- a fourth FeCo layer disposed on the sixth magnetic layer having a fourth thickness substantially equal to the third thickness.

13. The write head pole of claim 12, wherein the first thickness and the second thickness are greater than the third thickness and the fourth thickness.

14. A write head pole, comprising:
- a first non-magnetic layer;
- a first multi-layer magnetic structure disposed over the first non-magnetic layer, wherein each layer of the first multi-layer magnetic structure is crystalline;
- a second non-magnetic layer disposed over the first multi-layer magnetic structure, wherein the second non-magnetic layer is amorphous or microcrystalline;
- a second multi-layer magnetic structure disposed over the second non-magnetic layer and having fewer layers than the first multi-layer magnetic structure, wherein the second multi-layer magnetic structure has at least one non-magnetic layer positioned in the center of the second multi-layer magnetic structure, and each layer of the second multi-layer magnetic structure is crystalline; and
- a third non-magnetic layer disposed over the second multi-layer magnetic structure.

15. The write head pole of claim 14, wherein the first multi-layer magnetic structure comprises:
- a first magnetic layer having a first thickness;
- a second magnetic layer disposed on the first magnetic layer and having a second thickness;
- a fourth non-magnetic layer disposed on the second magnetic layer;
- a third magnetic layer disposed on the fourth non-magnetic layer and having a third thickness;
- a fourth magnetic layer disposed on the third magnetic layer and having a fourth thickness;
- a fifth magnetic layer disposed on the fourth magnetic layer and having a fifth thickness;
- a fifth non-magnetic layer disposed on the fifth magnetic layer; and
- a sixth magnetic layer disposed on the fifth non-magnetic layer and having a sixth thickness.

16. The write head pole of claim 15, wherein the first thickness and the fourth thickness are substantially the same.

17. The write head pole of claim 16, wherein the first magnetic layer and the fourth magnetic layer comprise NiFe.

18. The write head pole of claim 17, wherein the second thickness, the third thickness, the fifth thickness and the sixth thickness are substantially the same.

19. The write head pole of claim 18, wherein the second magnetic layer, the third magnetic layer, the fifth magnetic layer and the sixth magnetic layer comprise FeCo.

20. The write head pole of claim 15, wherein the second multi-layer magnetic structure comprises:
- a seventh magnetic layer having a seventh thickness;
- a sixth non-magnetic layer disposed on the seventh magnetic layer; and
- an eighth magnetic layer disposed on the sixth non-magnetic layer and having an eighth thickness.

21. The write head pole of claim 20, wherein the seventh thickness and the eighth thickness are substantially the same and wherein the seventh magnetic layer and the eighth magnetic layer comprise FeCo.

* * * * *